Jan. 11, 1938.  S. EVANS  2,104,799
PACKING FOR PIPE JOINTS
Filed Dec. 20, 1935

Seth Evans
INVENTOR
BY Jesse R. Stone
ATTORNEY

Patented Jan. 11, 1938

2,104,799

UNITED STATES PATENT OFFICE 2,104,799

PACKING FOR PIPE JOINTS

Seth Evans, Houston, Tex.

Application December 20, 1935, Serial No. 55,405

4 Claims. (Cl. 285—146)

My invention relates to means for preserving a seal at the joints in pipe. It is particularly adapted for use in tool joints on drill pipe where fluid pressures in the pipe are high and tend to leak unless the threaded connections are tightly engaged and sealed.

It is an object of the invention to provide a sealing ring to be employed at the pipe joints, said ring being arranged to be compressed by the pressure fluid into close sealing position.

I desire to provide passages from the interior fluid conduit through the wall of the joint to one side of the seal ring and thus permit the pressure of the fluid to force said ring into position to closely seal against escape of fluid at said joint.

I also desire to relieve the pressure upon the outer side of each seal ring so that said ring may be more effectively compressed into position.

I have as another object to provide a ring particularly formed to be expanded by the pressure fluid.

In the drawing herewith Fig. 1 is a side view partly in longitudinal section showing my seal ring in position in a tool joint.

Figure 1:
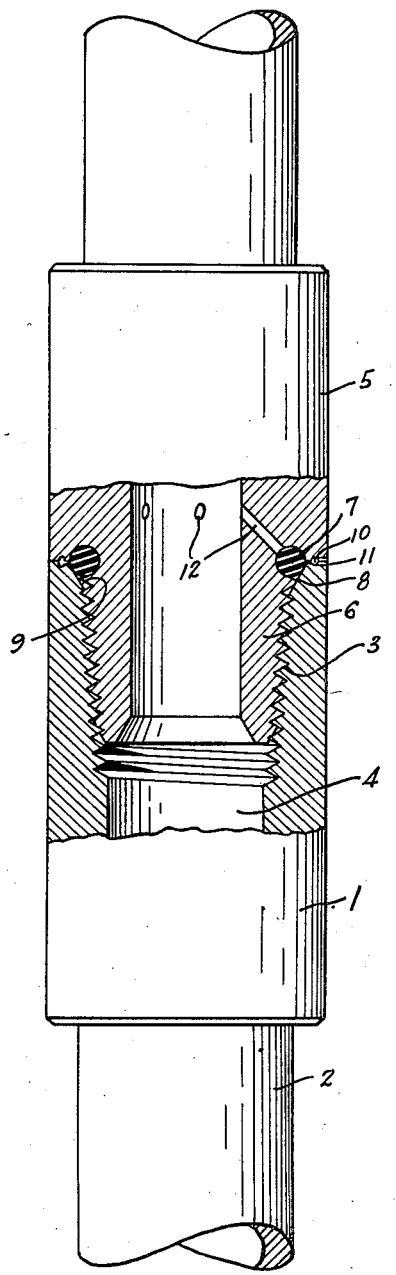

The tool joint disclosed in the drawing is of common construction. The box member 1 of the joint is attached to the end of a pipe section 2. The upper end of the box member has a threaded socket 3 tapered downwardly to the fluid conduit 4. The pin member 5 of the joint has a downwardly tapered pin 6 threaded to engage within the socket 3. The pin member 5 is also attached to a pipe section 2.

In Fig. 1 the sealing ring or gasket 7 is fitted within an annular recess at the upper end of the reduced portion 6 of the pin member. Said ring is circular in cross section and has to be somewhat compressed when it is forced through the opening or slot 8 at the entrance to the recess in which it fits. The ring projects from its recess and, when the joint is screwed up, will engage a beveled area 9 upon the end of the adjacent box member and be compressed thereby.

An annular channel is formed in the end of the box member and a similar channel is formed in the shoulder of the pin member. These channels cooperate to form a passage 10. At spaced points around the contacting surfaces of the joint members, weep holes 11 allow relief of pressure from the passage 10 to the outside.

The pressure fluid from the inner conduit 4 through the pipe is arranged to compress the packing ring through passages 12 extending in a downwardly and outwardly inclined direction from the interior of the pin member to the recess in which the ring is housed. The pressure fluid, ordinarily drilling mud, will act to compress the seal ring outwardly to seal against the adjacent surface 9 of the box member. The relief of pressure from the outside of the ring by way of the weep holes 11 will assure compression of the ring against the shoulder 9. Thus when the pressure of fluid in the joint tends to leak outwardly, the sealing effect of the gasket 7 will be the strongest and a tight joint is assured.

Figure 2:
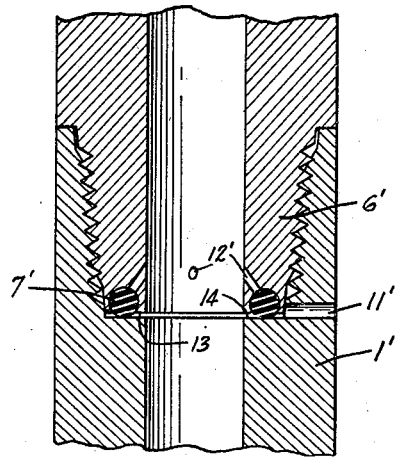
Fig. 2 is a central longitudinal section through a broken detail of a tool joint with my ring in a different position.

In Fig. 2, I show the arrangement of the seal ring at the smaller end of the pin member and in position to seal against the lower end of the box. The pin 6' is provided with a flattened end 13 wide enough to have formed therein an annular recess to receive the seal ring 7' which projects from the recess to engage a shoulder 14 on the lower end of the box 1'. The pressure fluid can engage behind this ring by way of passages 12'. Weep holes 11' allow a vent to the outside from the lower outer side of the seal ring.

Figure 3:
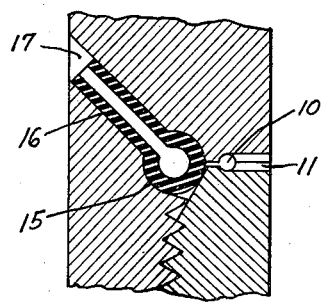
Fig. 3 is a sectional detail of a still different form of seal ring.
Figure 4:
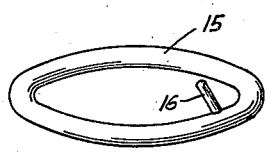
Fig. 4 is a perspective view of one of the seal rings disclosed in Fig. 3.

The seal ring may be a hollow tube similar to an inner pneumatic tire as shown at 15 in Figs. 3 and 4. An inlet tube 16 is connected upon the ring, said tube being adapted to fit within a passage 17 extending upwardly and inwardly from the recess in which the ring is housed. The ring is shown in Fig. 3 as being employed in the pin member as was done in the Fig. 1 embodiment but it is understood that it could be equally well adapted for use in the Fig. 2 form of the invention.

In this form of the invention, the pressure fluid will pass through the tube to the interior of the ring and act to inflate the ring into sealing engagement with the adjacent surfaces and assure a close seal while the pressure is on the pipe.

The engagement of the threaded connection of the box and pin members at each joint, if properly made, will sometimes prevent leakage but this cannot be relied upon. By the use of my seal ring any tendency of the joints to leak about the threads will be prevented by the action of my seal ring which packs tightest when the pressure is highest in the drill stem. By being housed in the recesses as described they will remain in position while the pipe sections are being handled and will, however, be advanced to sealing position by the fluid pressure.

What I claim as new is:

1. In a tool joint including one section having a threaded box member, and another section having thereon a tapered pin member threaded to engage with said box member, an annular recess formed at one end of said pin member, a seal ring shaped to fit within said recess and project slightly therefrom to contact with said box member when said members are screwed together, means to conduct pressure fluid from the interior of said joint to said recess to compress said gasket into sealing engagement with said box member, and means to relieve pressure of fluid at the outer side of said ring.

2. In a tool joint including one section having a threaded box member, and another section having thereon a tapered pin member threaded to engage with said box member, an annular recess formed at one end of said pin member, a seal ring shaped to fit within said recess and project slightly therefrom to contact with said box member when said members are screwed together, means including passages downwardly and outwardly inclined from the interior of said pin member to conduct pressure fluid from the interior of said joint to said recess to compress said gasket into sealing engagement with said box member, and means to relieve pressure of fluid at the outer side of said ring.

3. In a tool joint including one section having a threaded box member, and another section having thereon a tapered pin member threaded to engage with said box member, an annular recess of circular contour in cross section countersunk in one end of said pin member, a seal ring shaped to fit within said recess and having more than half of its periphery surrounded by the wall of said recess, but projecting slightly therefrom to contact with said box member where said members are screwed together, and means to conduct pressure fluid from the interior of said joint to said recess to compress said gasket into sealing engagement with said box member.

4. In a tool joint including one section having thereon a threaded box member, and another section having thereon a tapered pin member threaded to engage with said box member, an annular recess formed at one end of said pin member, a seal ring shaped to fit within said recess and positioned to contact with said box member when said members are screwed together, means including passages downwardly and outwardly inclined from the interior of said pin member, to conduct pressure fluid from the interior of said joint to said recess to compress said gasket into sealing engagement with said box member, and weep holes from said recess to the exterior of said joint for the purpose set forth.

SETH EVANS.